United States Patent
Whatmough (10) Patent No.: US 7,525,544 B2
(45) Date of Patent: Apr. 28, 2009

(54) SYSTEM AND METHOD OF CONVERTING EDGE RECORD BASED GRAPHICS TO POLYGON BASED GRAPHICS

(75) Inventor: Ken Whatmough, Georgetown (CA)

(73) Assignee: Research In Motion Limited, Waterloo (CA)

(*) Notice: Subject to any disclaimer, the term of this patent is extended or adjusted under 35 U.S.C. 154(b) by 210 days.

(21) Appl. No.: 10/825,130

(22) Filed: Apr. 16, 2004

(65) Prior Publication Data

US 2004/0208370 A1 Oct. 21, 2004

(30) Foreign Application Priority Data

Apr. 17, 2003 (GB) .................. 0308949.7

(51) Int. Cl.
G06T 17/00 (2006.01)
(52) U.S. Cl. .................... 345/428
(58) Field of Classification Search .......... 345/428
See application file for complete search history.

(56) References Cited

U.S. PATENT DOCUMENTS

| | | | |
|---|---|---|---|
| 5,303,340 A | 4/1994 | Gonzalez-Lopez et al. | |
| 5,621,827 A | 4/1997 | Uchiyama et al. | |
| 5,689,577 A * | 11/1997 | Arata | 382/128 |
| 5,894,308 A * | 4/1999 | Isaacs | 345/420 |
| 5,923,777 A | 7/1999 | Chun et al. | |
| 5,953,506 A * | 9/1999 | Kalra et al. | 709/231 |
| 5,999,187 A * | 12/1999 | Dehmlow et al. | 345/420 |
| 6,041,138 A | 3/2000 | Nishida | |
| 6,362,820 B1 * | 3/2002 | Hoppe | 345/423 |
| 6,538,652 B2 * | 3/2003 | Kato | 345/423 |
| 6,560,361 B1 | 5/2003 | Collins | |
| 6,809,738 B2 * | 10/2004 | Hubrecht et al. | 345/543 |
| 6,874,150 B2 * | 3/2005 | Noyle | 719/328 |
| 6,961,737 B2 * | 11/2005 | Ritchie et al. | 707/201 |
| 7,002,601 B1 * | 2/2006 | Sherburne | 345/629 |
| 2002/0158880 A1 * | 10/2002 | Willimas et al. | 345/582 |

(Continued)

FOREIGN PATENT DOCUMENTS

GB 0308949.7 10/2002

(Continued)

OTHER PUBLICATIONS

Steve Probets"Flash and SVG" http://www.eprg.org/research/SVG/flash2svg/ [Apr. 5, 2000] Document Engineering Lab, The University of Nottingham.*

(Continued)

Primary Examiner—Kee M Tung
Assistant Examiner—David H Chu
(74) Attorney, Agent, or Firm—Ridout & Maybee LLP (57) ABSTRACT

A method for converting graphic object data that defines a graphic object, including converting the graphic object data from a path format to a second format, the path format including path elements that are each associated with a fill style and define one or more polygon shapes at least partially filled with the associated fill style, the path elements collectively defining the graphic object. The conversion includes (i) redefining the polygon shapes defined by the path elements as groups of triangles, and (ii) combining at least some of triangles in the groups of triangles into further polygon shapes that fall within predetermined complexity thresholds.

17 Claims, 11 Drawing Sheets

U.S. PATENT DOCUMENTS

| | | | |
|---|---|---|---|
| 2003/0085887 A1* | 5/2003 | Hunt et al. | 345/418 |
| 2003/0098862 A1 | 5/2003 | Hunt et al. | |
| 2003/0103250 A1* | 6/2003 | Kidokoro et al. | 358/524 |
| 2004/0073873 A1* | 4/2004 | Croney et al. | 715/526 |
| 2005/0155027 A1* | 7/2005 | Wei | 717/162 |
| 2007/0038610 A1* | 2/2007 | Omoigui | 707/3 |

FOREIGN PATENT DOCUMENTS

| | | |
|---|---|---|
| WO | WO 02/071757 A2 | 9/2002 |

OTHER PUBLICATIONS

Steve Probets "Sematics of Macromedia's Flash (SWF) Format and its Relationship to SVG" http://www.eprg.org/research/SVG/flash2svg/swfformat.php [Jan. 6, 2000] Document Engineering Lab, The University of Nottingham.*

W3C "4 SVG Document Structure" http://www.w3.org/TR/1999/WD-SVG-19990211/struct.html [Feb. 11, 1999].*

W3C "Mobile SVG Profiles: SVG Tiny and SVG Basic" http://www.w3.org/TR/SVGMobile/ [Jan. 14, 2003].*

FIST:Fast Industrial-Strength Triangulation of Polygons, Algorithmica (2001).

UK Patent Office Search Report issued Sep. 8, 2003 in respect of GB030849.7.

Held, M; "FIST: Fast Industrial-Strength Triangulation of Polygons" Algorithmica, Springer Verlag, New York, NY, US. vol. 30, No. 4, Aug. 2001; pp. 563-596, XP001133722; ISSN: 0178-4617 *pp. 563, paragraph 1—p. 564, paragraph 1.2*; *p. 567, line 1—p. 567, last line; figure 1*; *p. 573, paragraph 3—p. 575, paragraph 4*.

Further Search Report corresponding to GB Application Serial No. GB0308949.7 dated Feb. 24, 2005.

* cited by examiner

<FillStyleArray>                                    ┌─ 126
 <SolidFill                                         ↙
     color="Color(0,0,255)"/>    <!-- Fill Style index 1 -->
 <SolidFill
     color="Color(0,255,0)"/>    <!-- Fill Style index 2 -->
 <SolidFill
     color="Color(255,0,0)"/>    <!-- Fill Style index 3 -->
</FillStyleArray>
<LineStyleArray>
 <LineStyle
     width="1.0"
     color="Color(0,0,0)"/>
</LineStyleArray>        ┌─ 127
<StyleChangeRecord
     moveTo="Vertex(100.0,80.0)"            ┌─ 124
     fillStyle1="1"                         ↙
     lineStyle="1"/>
<StraightEdgeRecord
     delta="Delta(20.0,0.0)"/>    <!-- Edge 1 -->
<StraightEdgeRecord
     delta="Delta(0.0,40.0)"/>    <!-- Edge 2 -->
<StraightEdgeRecord
     delta="Delta(-40.0,0.0)"/>   <!-- Edge 3 -->
<StraightEdgeRecord
     delta="Delta(0.0,-20.0)"/>   <!-- Edge 4 -->
<StyleChangeRecord ←─
     fillStyle1="3"/>   127
<StraightEdgeRecord
     delta="Delta(-50.0,0.0)"/>   <!-- Edge 5 -->
<StraightEdgeRecord
     delta="Delta(0.0,-50.0)"/>   <!-- Edge 6 -->
<StyleChangeRecord ←─
     fillStyle1="1"/>   127
<StraightEdgeRecord
     delta="Delta(-20.0,0.0)"/>   <!-- Edge 7 -->
<StraightEdgeRecord
     delta="Delta(0.0,-40.0)"/>   <!-- Edge 8 -->
<StraightEdgeRecord
     delta="Delta(40.0,0.0)"/>    <!-- Edge 9 -->
```

FIG. 4

```
                                                               124
<StraightEdgeRecord
    delta="Delta(0.0,20.0)"/>      <!-- Edge 10 -->
<StyleChangeRecord  ~127
    fillStyle1="3"/>
<StraightEdgeRecord
    delta="Delta(50.0,0.0)"/>      <!-- Edge 11 -->
<StraightEdgeRecord
    delta="Delta(0.0,50.0)"/>      <!-- Edge 12 -->
<StyleChangeRecord  ~127
    fillStyle0="1"
    fillStyle1="2"/>
<StraightEdgeRecord
    delta="Delta(0.0,20.0)"/>      <!-- Edge 13 -->
<StraightEdgeRecord
    delta="Delta(-20.0,0.0)"/>     <!-- Edge 14 -->
<StyleChangeRecord  ~127
    fillStyle0="3"/>
<StraightEdgeRecord
    delta="Delta(0.0,-20.0)"/>     <!-- Edge 15 -->
<StraightEdgeRecord
    delta="Delta(20.0,0.0)"/>      <!-- Edge 16 -->
<StyleChangeRecord
    moveTo="Vertex(70.0,60.0)"    127
    fillStyle1="0"/>
<StraightEdgeRecord
    delta="Delta(0.0,10.0)"/>      <!-- Edge 17 -->
<StraightEdgeRecord
    delta="Delta(-10.0,0.0)"/>     <!-- Edge 18 -->
<StraightEdgeRecord
    delta="Delta(0.0,-10.0)"/>     <!-- Edge 19 -->
<StraightEdgeRecord
    delta="Delta(10.0,0.0)"/>      <!-- Edge 20 -->
<StyleChangeRecord
    moveTo="Vertex(30.0,50.0)"    127
    fillStyle0="1"
    fillStyle1="2"/>
<StraightEdgeRecord
    delta="Delta(0.0,-20.0)"/>     <!-- Edge 21 -->
<StraightEdgeRecord
    delta="Delta(20.0,0.0)"/>      <!-- Edge 22 -->
<StyleChangeRecord  ~127
    fillStyle0="3"/>
<StraightEdgeRecord
    delta="Delta(0.0,20.0)"/>      <!-- Edge 23 -->
<StraightEdgeRecord
    delta="Delta(-20.0,0.0)"/>     <!-- Edge 24 -->
```

FIG. 4
(continued)

| | | 132 ─╮ ／ ─ 120A | |
|---|---|---|---|
| Blue fill style 128 | 130 | Vertex (100, 80) | Outgoing Edges 1, 13 | 134
| | | Vertex (120, 80) | Outgoing Edge 2 |
| | | Vertex (120, 120) | Outgoing Edge 3 |
| | | Vertex (80, 120) | Outgoing Edge 4 |
| | | Vertex (30, 50) | Outgoing Edges 7, 21 |
| | | Vertex (10, 50) | Outgoing Edge 8 |
| | | Vertex (10, 10) | Outgoing Edge 9 |
| | | Vertex (50, 10) | Outgoing Edge 10 |
| | | Vertex (100, 100) | Outgoing Edge 14 |
| | | Vertex (30, 30) | Outgoing Edge 22 |
| Green fill style 128 | 130 | Vertex (100, 80) | Outgoing Edge 13 | 134
| | | Vertex (100, 100) | Outgoing Edge 14 |
| | | Vertex (80, 100) | Outgoing Edge 15 |
| | | Vertex (80, 80) | Outgoing Edge 16 |
| | | Vertex (30, 50) | Outgoing Edge 21 |
| | | Vertex (30, 30) | Outgoing Edge 22 |
| | | Vertex (50, 30) | Outgoing Edge 23 |
| | | Vertex (50, 50) | Outgoing Edge 24 |
| Red fill style 128 | 130 | Vertex (80, 100) | Outgoing Edges 5, 15 | 134
| | | Vertex (30, 100) | Outgoing Edge 6 |
| | | Vertex (50, 30) | Outgoing Edge 11 |
| | | Vertex (100, 30) | Outgoing Edge 12 |
| | | Vertex (80, 80) | Outgoing Edge 16 |
| | | Vertex (70, 60) | Outgoing Edge 17 |
| | | Vertex (70, 70) | Outgoing Edge 18 |
| | | Vertex (60, 70) | Outgoing Edge 19 |
| | | Vertex (60, 60) | Outgoing Edge 20 |
| | | Vertex (50, 30) | Outgoing Edge 23 |
| | | Vertex (50, 50) | Outgoing Edge 24 |

```
<?xml version="1.0"?>
<!DOCTYPE svg SYSTEM "svg.dtd">
<svg
    width="130.0"
    height="130.0">

<!-- Background rectangle -->
  <rect
      x="0.0"
      y="0.0"
      width="130.0"
      height="130.0"
      fill="rgb(255,255,255)"/>

<g
      transform="translate(0.0 0.0) ">
    <path
        fill="rgb(0,0,255)"
        stroke="none"
        d="M120.0 80.0L100.0 80.0L100.0 100.0L80.0 100.0L80.0 120.0L120.0 120.0L120.0 80.0M10.0 50.0L30.0 50.0L30.0 30.0L50.0 30.0L50.0 10.0L10.0 10.0L10.0 50.0"/>
    <path
        fill="rgb(0,255,0)"
        stroke="none"
        d="M100.0 100.0L100.0 80.0L80.0 80.0L80.0 100.0L100.0 100.0M30.0 30.0L30.0 50.0L50.0 50.0L50.0 30.0L30.0 30.0"/>
    <path
        fill="rgb(255,0,0)"
        stroke="none"
        d="M30.0 100.0L80.0 100.0L80.0 80.0L100.0 80.0L100.0 30.0L50.0 30.0L50.0 50.0L30.0 50.0L30.0 100.0M70.0 60.0L70.0 70.0L60.0 70.0L60.0 60.0L70.0 60.0"/>
    <path
        fill="none"
        stroke="rgb(0,0,0)"
        stroke-width="1.0"
        stroke-linecap="round"
        stroke-linejoin="round"
        d="M100.0 80.0L120.0 80.0L120.0 120.0L80.0 120.0L80.0 100.0L30.0 100.0L30.0 50.0L10.0 50.0L10.0 10.0L50.0 10.0L50.0 30.0L100.0 30.0L100.0 80.0L100.0 80.0L80.0 80.0L80.0 100.0L80.0M30.0 50.0L30.0 30.0L50.0 30.0L50.0 50.0L30.0 50.0M70.0 60.0L70.0 70.0L60.0 70.0L60.0 60.0L70.0 60.0"/>
  </g>
</svg>
```

SYSTEM AND METHOD OF CONVERTING EDGE RECORD BASED GRAPHICS TO POLYGON BASED GRAPHICS

This application claims priority to United Kingdom Patent Application No. GB0308949.7 filed Apr. 17, 2003.

BACKGROUND OF THE INVENTION

The present invention relates to computer graphics files.

Various types of formats are used to represent computer graphics. As the use of resource limited media devices such as personal digital assistants (PDAs), cell phones, pagers, organizers and wireless mobile computing devices, grows, the interest in displaying graphics images on such devices also grows. However, such devices frequently have limited storage and processing power, and where applicable, limited communication bandwidth. As a result, such devices can benefit from the use of graphic formats that are different from those commonly used in relatively resource rich devices. Thus, it would be advantageous to provide a system and method for converting one format of graphic to another format suitable for a resource limited device.

SUMMARY OF THE INVENTION

Embodiments of the present invention provide a system and method for converting one format of a graphic to another format.

According to an example embodiment, there is provided a method for converting graphic object data that defines a graphic object. The method includes converting the graphic object data from a path format to a second format, the path format including path elements that are each associated with a fill style and define one or more polygon shapes at least partially filled with the associated fill style, the path elements collectively defining the graphic object. The conversion includes (i) redefining the polygon shapes defined by the path elements as groups of triangles, and (ii) combining at least some of triangles in the groups of triangles into further polygon shapes that fall within predetermined complexity thresholds. In various embodiments, the method includes a first converting step of converting the graphic object data from an edge record based format to the path format, the edge record based format including a plurality of edge records each defining an edge of the graphic object, the edge records including information associating the defined edges with fill styles that the edges border against.

According to another example embodiment, there is provided a method for converting graphic object data defining a graphic object from an edge record based format to a path format, the edge record based format including a plurality of edge records each defining an edge of the graphic object, the edge records including information associating the defined edges with fill styles that the edges border against, the path format including path elements that each define one or more polygon shapes that are filled with an associated fill style, the path elements collectively defining the graphic object. The method includes, for each fill style, identifying from the edge records each unique vertex that borders on the fill style and identifying each of the outgoing edges from the identified vertices that border on the fill style; and for each fill style, creating an associated path element defining one or more polygon shapes that are filled with the identified unique fill style, based on the identified vertices and outgoing edges.

According to another example embodiment of the invention, there is provided a system for converting graphic object data defining a graphic object having associated fill styles from a path format to a second format, the path format including path elements that are each associated with a fill style and define one or more polygon shapes at least partially filled with the associated fill style, the path elements collectively defining the graphic object. The system includes a triangulation module for redefining the polygon shapes defined by the path elements as groups of triangles, and a combining module for combining at least some of triangles in the groups of triangles into further polygon shapes that fall within predetermined complexity thresholds.

According to a further example embodiment of the invention, there is provided a computer software product having a computer-readable medium tangibly embodying computer executable instructions for converting graphic object data that defines a graphic object, the computer executable instructions comprising instructions for performing the methods described in the present application.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

Embodiments of the present invention will now be described, by way of example only, with reference to the attached Figures, wherein:

FIG. 4 is a representation of a source graphic file describing the graphic object of FIG. 3;

FIG. 7 is a representation of an intermediate graphic file describing the graphic object of FIG. 3;

Like reference numerals are used throughout the Figures to denote similar elements and features.

DETAILED DESCRIPTION

Figure 1:
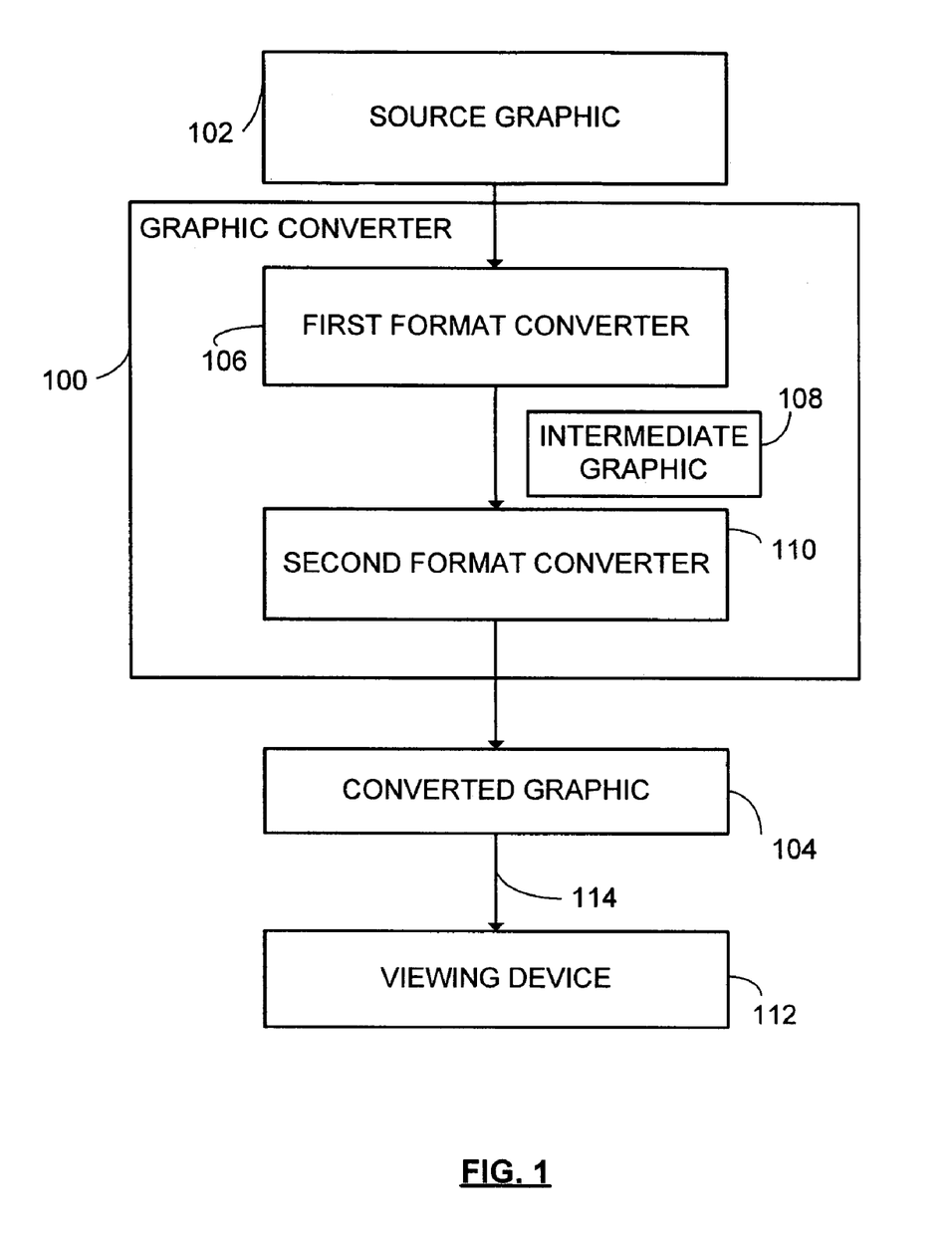
FIG. 1 is a block diagram showing a format conversion system according to embodiments of the invention.

Referring to the drawings, FIG. 1 is a block diagram of a graphic format conversion system according to example embodiments of the invention. The system includes a graphic converter 100 that converts a source graphic 102 that is in a first format to a converted graphic 104 that is in a second format. The source graphic 102 is an electronic file containing graphic object data or information that can be used by a suitably configured rendering device to display one or more graphics objects. In an example embodiment, the source graphic 102 contains information in an edge record format to define the graphic objects. More particularly, in the presently described example embodiment, the source graphic 102 is a .SWF file conforming to the flash file format specified by Macromedia, Inc. The converted graphic 104 is an electronic file containing converted information that can be used by a viewing device 112 to display the one or more graphics objects. In the presently described embodiment, the converted graphic 104 is binary format file in which the graphics objects are defined as a series of polygon shapes, each associated with a fill style.

The first format converter 106 and the second format converter 110 of the graphic converter 100 are implemented as computer software which is executed by one or more computers. In various embodiments, the first and second format converters 106, 110 are both implemented by software on the same computer, or are implemented by software on different computers, with the intermediate graphic 108 being transmitted or otherwise transferred between the computers.

The viewing device 112 is in various embodiments a data communications device, a multiple mode communications device configured for both data and voice communication, a mobile communications device, a PDA enabled for wireless communications, a 1-way or 2-way pager, a computer system, and/or a type of fixed or wireless communications device. The viewing device 112 receives the converted graphic 104 over a communication link 114, which includes in various embodiments a wireless network, a wired network, and/or dedicated or local communications lines or conductors. The viewing device 112 includes an application such as a media engine that is configured to interpret the information contained in the converted graphic 104 and generate a visible image on a screen of the viewing device representative of the information contained in the converted graphic 104.

Figure 2:
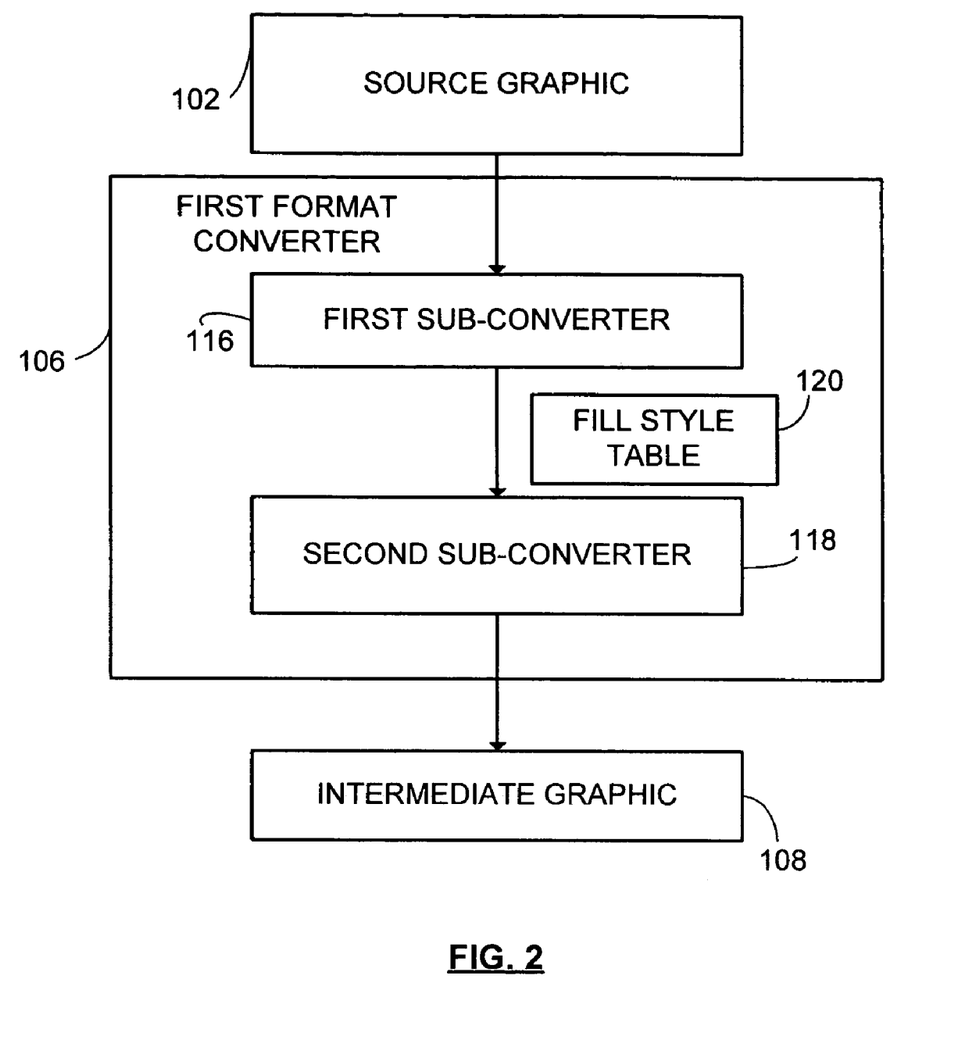
FIG. 2 is a block diagram showing a first format converter of the format conversion system of FIG. 1.

FIG. 2 is a block diagram of the first format converter 106, which in an example embodiment is configured to convert a .SWF flash file source graphic 102 into a SVG (scalable vector graphics) format intermediate graphic 108. As known in the art SVG is a vector graphics file format that enables two-dimensional images to be displayed in XML pages. SVG images are created through text-based commands formatted to comply with XML specifications. An SVG standard, SVG 1.0 specification has been recommended by W3C (World Wide Web Consortium). In various embodiments, the first and second format converters 106, 110 may not support all SVG specified features, however the features they do support conform to SVG specifications.

As shown in FIG. 2, the first format converter 106 includes first and second sub-converters 116, 118. The first sub-converter 116 is configured to convert the edge records that are contained in the .SWF flash file source graphic 102 into a fill style table 120, which is then converted by the second sub-converter 118 into SVG intermediate graphic 108.

Figure 3:
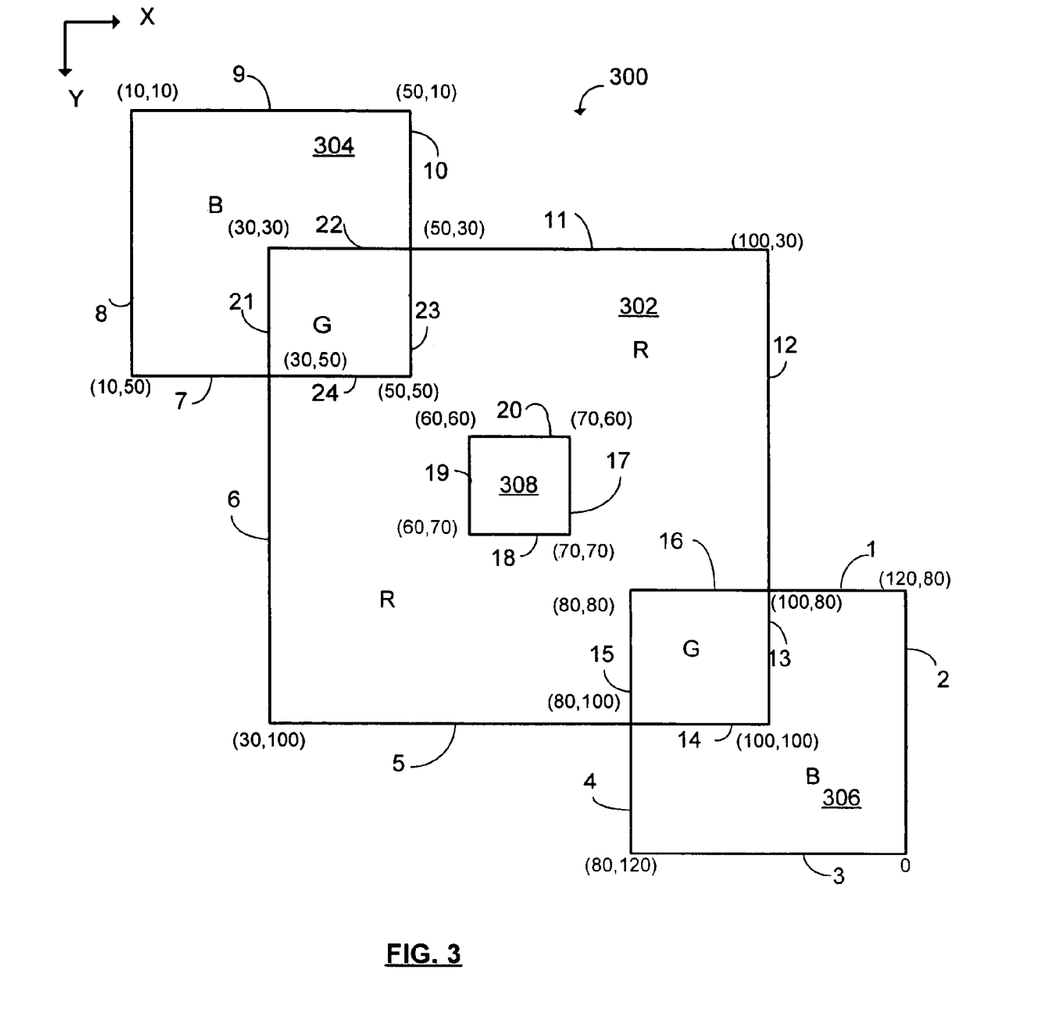
FIG. 3 is a block diagram of a representative graphic object for explaining aspects of the invention.

For the purpose of explaining embodiments of the invention, FIG. 3 shows a representation of an example of a two dimensional graphical object 300. The graphical object 300 comprises a central square 302, overlapped on diagonal corners by two smaller squares 304 and 306. The central square 302 has a square opening 308 in its center. The smaller squares 304 and 306 are filled with blue (as denoted by "B" in FIG. 3), the central square 302 is filled with red (as denoted by "R" in FIG. 3), and the overlap regions between the squares are filled with green (as denoted by "G" in FIG. 3). The square opening 308 has no fill style. The object 300 has 24 edges, labelled by reference numerals 1 to 24 in FIG. 3. An edge is a line in the object 300 that has start and end points at locations where the line meets at a vertex with another line or where the line terminates without meeting another line. Each vertex (i.e. point where two or more edges meet) of the object 300 in FIG. 3 is labelled with absolute (X,Y) coordinates.

FIG. 4 shows an example source graphic file 102A showing a series of edge records 124, each associated with an edge 1 to 24 of the graphic object 300. The file 102A is an XML representation of a .SWF flash file edge record format used in source graphic 102 to describe the graphic object 300—here the use of XML is purely for illustrative purposes; .SWF is a binary file format, and thus example file 102A is a human readable description of the .SWF source graphic file for graphic object 300. As can be seen in FIG. 4, the source file 102A includes fill style indexes 126 for each of the fill styles (blue, green and red, in the illustrated example) used in the graphic object 300. The source file 102A includes "StyleChangeRecords" 127 that associate the edge records for each edge 1-24 with the fill style(s) that the respective edge borders. The source file 102A also includes a LineStyle command that specifies the characteristics of lines used around the edges of the fill regions. The source graphic file 102A defines a starting absolute (X,Y) coordinate value in the display plane, namely vertex (100, 80), and defines the first edge 1 by specifying an (X,Y) delta value (20,0) that specifies the end point of first edge 1 relative to the starting vertex. Edge 2 is then defined by a delta value (0,40) that specifies the end point of the first edge 2 relative to its starting point (which is the end of first edge 1). The remaining edges are defined in a similar manner, with "moveTo" commands being used where the starting point of an edge does not coincide with the end of a previously defined edge (see for example, the moveTo command between edge record 16 and edge record 17 in FIG. 4). The edge records can appear in any particular order, and the first sub-converter 116 makes no assumptions about the order of edge records. The edge records can define fill on both sides (see edges 21 and 22 for example).

Figure 5:
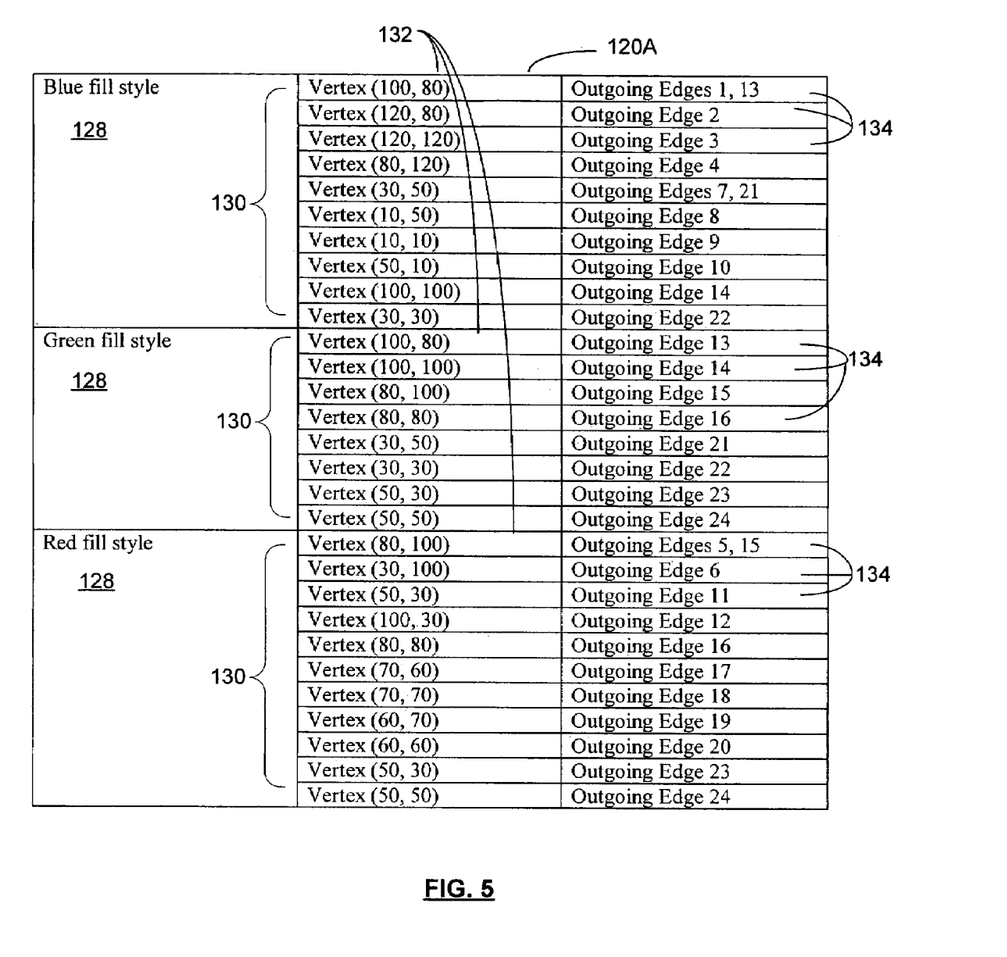
FIG. 5 is a representation of a fill style table describing the graphic object of FIG. 3.

The first sub-converter 116 is configured to read the information in the source graphic 102 and construct and populate a corresponding fill style table 120. FIG. 5 shows an example fill style table 120A representative of the output of first sub-converter 116 in response to the source graphic file 102A. The fill style table 120A includes a sub-table 128 associated with each unique fill style (blue, green, red in the present example) specified in the source graphic file 102A. Each of the sub-tables 128 includes edge connection data 130 that describes the perimeter(s) of any areas that are filled with the fill style associated with the respective sub-tables. For example, in graphic object 300, there are two blue fill style region areas, and the edge connection data 130 for the blue fill style defines the perimeters of the two blue fill style region areas. The connection data 130 for each of the fill styles includes a list 132 of each unique vertex that borders the regions that are filled with the associated fill style. Associated with each vertex entry is a list 134 of the edges that are outgoing from each vertex that borders the associated fill style regions. The lists 134 of edges in connection data 130 includes, for each edge, information defining the "to" vertex that the edge ends at—for example, the first list 134 in table 120A identifies edges 1 and 13 as outgoing from vertex (100, 80) and having "to" vertices (120, 80) and (100,100), respectively.

Figure 6:
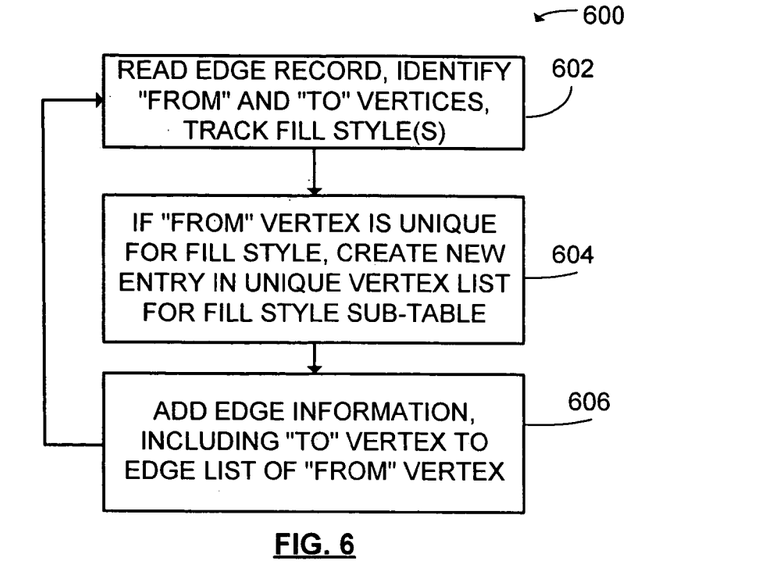
FIG. 6 is a block diagram of a process used to create a fill style table according to embodiments of the invention.

In an example embodiment, the first sub-converter 116 performs process 600 shown in FIG. 6 in respect of each of the edge records in source graphic 102 to create the fill style table. As indicated in step 602, the first sub-converter 116 reads an edge record 124 in the source graphic 102 and identifies the "from" and "to" vertices of the subject edge. As the sub-converter 116 processes each edge record, it identifies the "from" vertex of each edge by keeping track of the absolute coordinates provided in the "MoveTo" commands that are embedded in selected StyleChange Records 127, and also by tracking the "delta" commands that are contained in the edge records 124. In step 602, the "to" vertex for the subject edge is determined by adding the delta coordinates provided in the subject edge record to the coordinates of the "from" vertex of the edge. By tracking StyleChange Records 127, the sub-converter 116 tracks the fill style(s) that the subject edge borders against—as can be appreciated from FIG. 3, a single edge (for example, edge 13) can border against and thus be associated with more than one fill style.

As indicated in step 604, once the "from" and "to" vertices of the subject edge have been identified, the sub-converter 116 looks at the sub-table 128 of the fill style associated with the subject edge to determine if the "from" vertex is already listed in the sub-table and will create a new unique "from" vertex entry in the list 132 of the appropriate fill style sub-table 128 if the "from" vertex has not yet been previously added. In instances where the edge is associated with two fill styles, the "from" vertex is included in the unique vertex list 132 of each of the associated fill style sub-tables 128. As indicated in step 606, information identifying the subject edge, including it's "to" vertex is then added to the outgoing edges list 134 of the "from" vertex of the subject edge. In instances where the edge is associated with two fill styles, the information is added to the outgoing edge list 130 of the "from" vertex in each of the associated fill style sub-tables 128. Steps 602, 604 and 606 are repeated until all edge records in the source graphic have been processed. In the example embodiment illustrated through source graphic file 102A and fill style table 120A, the delta coordinate values in the edge records of source graphic file 102A are converted to absolute X,Y coordinate values for the vertices listed in fill style table 120A. It will be understood that the information contained in fill style table 120A represents the example graphic object 300. Line Style information is in various embodiments identified in the edge connection data 130.

The second sub-converter 118 of the first format converter 106 is configured to convert the fill style table 120 into SVG compatible intermediate graphic 108. For explanatory purposes, FIG. 7 shows the XML SVG source code of an intermediate graphic file 108A that is generated by the second sub-converter 118 in response to fill style table 120A, and which describes graphic object 300. The intermediate graphic file 108A includes an SVG path element 136(1), 136(2) and 136 (3) for each of the unique fill styles (blue, green, red, respectively) found in the fill style table 120. Each SVG path element 136(i), where 1≧i≧3 in the described example, describes a fill region (which may have multiple discrete parts) for the fill type that it is associated with. The intermediate graphic file 108A also includes a path element 138 that describes the "stroke", which defines the lines that surround the edges of the fill regions. In example graphic object 300, a stroke having a black color and a width of one pixel is used throughout the object.

The following table represents in pseudo code an example method used by the second sub-converter 118 to convert the fill style table 120 into intermediate graphic 108:

TABLE 1

Method for Converting Fill Style Table
to SVG Intermediate Graphic for each fill style in the fill style table:
    begin writing an SVG 'path' element for that fill style
    obtain the edge connection data for that fill style
    reset all edges to "unvisited"

TABLE 1-continued

Method for Converting Fill Style Table
to SVG Intermediate Graphic for each vertex in the edge connection data:
        obtain the list of outgoing edges for that vertex
        for each edge, L, in the list:
            visit (L)
    finish writing the SVG 'path' element
procedure visit (edge E)
    if (E is unvisited)
        mark E as "visited"
        write the SVG drawing command represented by E
        obtain the list of outgoing edges for the
        "to" vertex of E
        find the first unvisited edge, M, in the
        list and, if found:
            visit (M)

Figure 8:
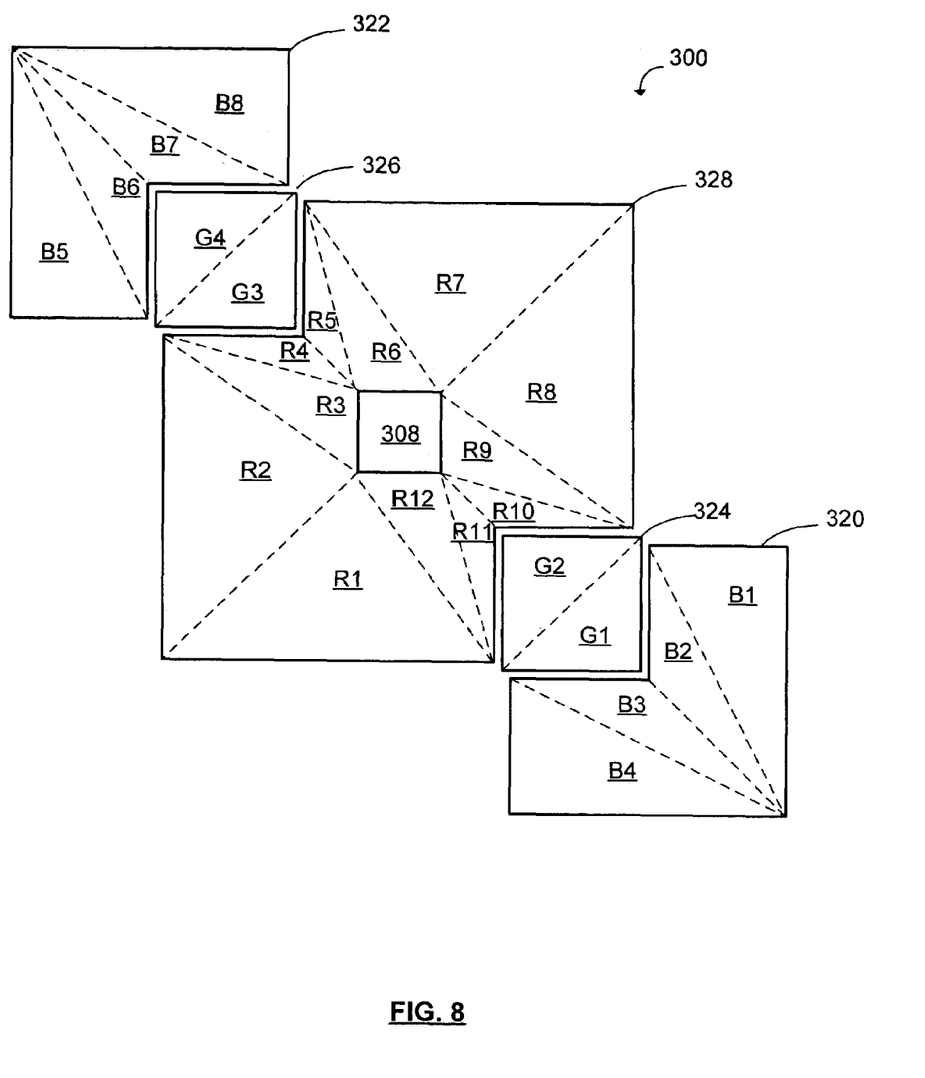
FIG. 8 is an exploded view of the graphic object of FIG. 3.

As can be appreciated from FIG. 7, each SVG path element 136(i) effectively describes one or more polygons that are filled with the fill style that the path element is associated with. By way of example, FIG. 8 shows an exploded view of graphic object 300. Path element 136(1) describes the blue fill style region which includes polygons 320 and 322 that are filled with blue fill style. Path element 136(2) describes the green fill style region that includes polygons 324 and 326 that are filled with green fill style. Path element 136(3) describes the red fill style region, which includes polygon 328 that is filled with red and which includes an island contour that defines non-fill region 308. Path 138 describes the "stroke" surrounding the fill regions.

Figure 9:
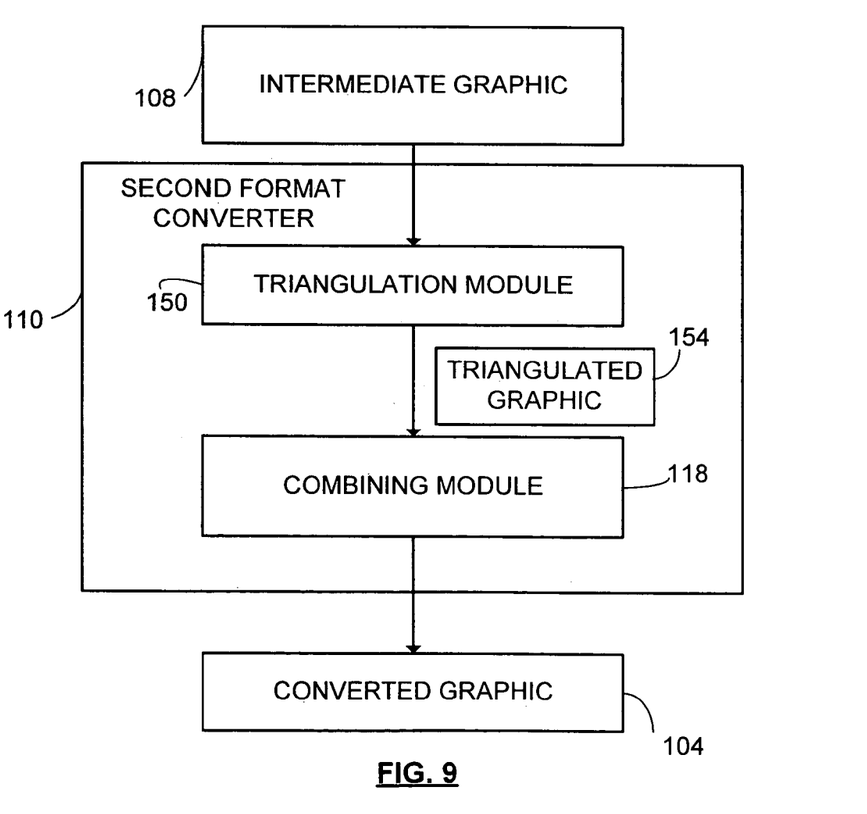
FIG. 9 is a block diagram showing a second format converter of the format conversion system of FIG. 1.

As can be appreciated from FIGS. 7 and 8, the SVG path elements of the intermediate graphic can define relatively complex polygons. The second format converter 110 is configured to compile the SVG intermediate graphic 108 into less complex polygons that can be efficiently used by a media engine of the viewing device 112 to reproduce the graphic object 300. With reference to FIG. 9, the second format converter includes a triangulation module 150 and a combining module 152. The triangulation module 150 resolves the polygon shapes that are defined by each of the SVG path elements of the intermediate graphic 108 to output data defining a series of triangles that are each associated with a fill style. The information defining the triangles and associated fill styles are output as electronic triangulated graphic data 154.

By way of example, FIG. 8 includes dashed lines showing one possible triangulation of polygons 320, 322, 324, 326 and 328 of graphic object 300 performed by triangulation module 150. In the illustrated example, blue fill style polygons 320 and 322 have been redefined as triangles B1-B4 and B5-B8, respectively. Green fill style polygons 324 and 326 have been redefined as triangles G1-G2 and G3-G4, respectively. Red fill style polygon 328 has been redefined as triangles R1-R12. Various triangulation methods can be used in various embodiments to triangulate the polygons defined in the SVG intermediate graphic. In an example embodiment, a triangulation method based on the FIST (Fast Industrial-Strength Triangulation of Polygons) algorithm as described in Held, M., FIST: Fast Industrial-Strength Triangulation of Polygons, *Algorithmica* (2001) 30: 563-596, DOI: 10.1007/s00453-001-0028-4, is used by triangulation module 150.

In an example embodiment the triangulated graphic data 154 includes records that define the edges and vertices and associated fill styles of each of the triangles that make up the subject graphic object. In order to reduce the amount of data required to define the subject graphic object, the combining module 152 of the second format converter 110 is configured to combine the triangles defined in triangulated graphic data 154 into larger polygons that fall within predetermined complexity restrictions.

Figure 10:
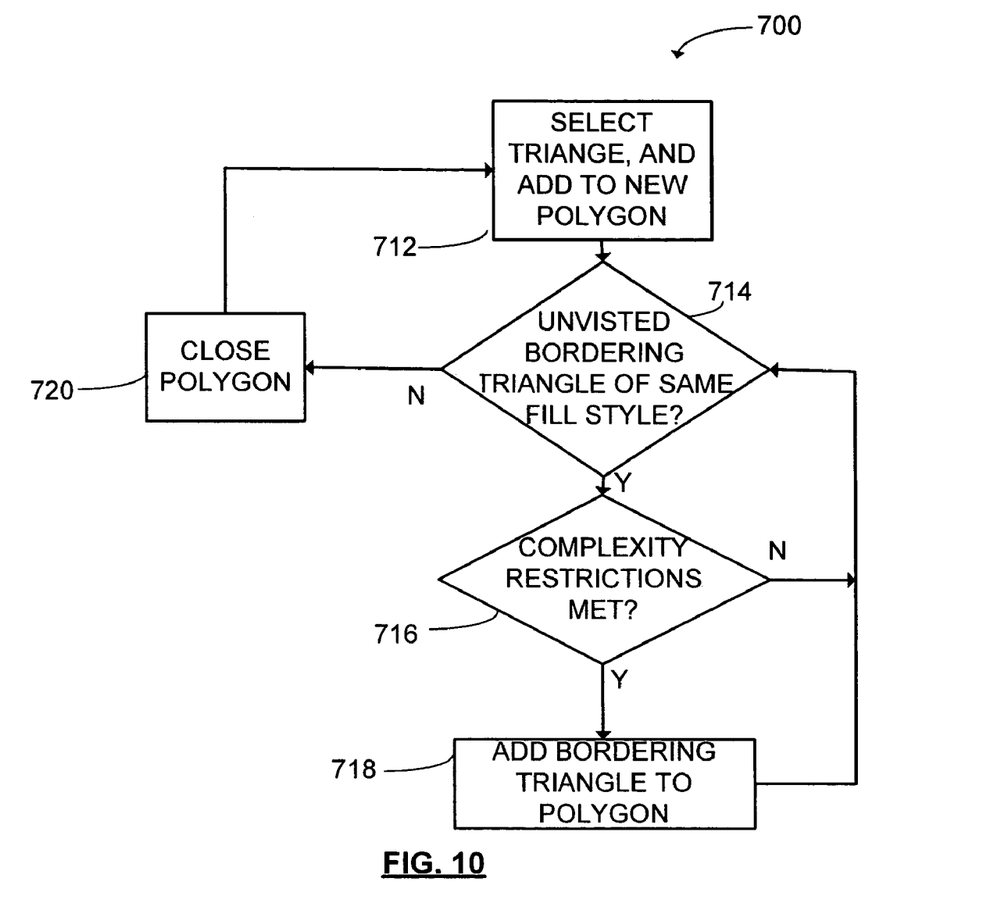
FIG. 10 is a block diagram of a process used to combine triangulated regions into polygons, according to embodiments of the invention.

FIG. 10 shows a combining process 700 used by combining module 152 in an example embodiment of the invention. As indicated in step 712, the combining module 152 creates a new polygon record by selecting a triangle from the triangulated graphic data 154 and adding the data that defines the triangle to the polygon record. As indicated in step 714, the combining module 152 than determines if there is a same fill style triangle that borders on the polygon which has not already part of a polygon previously created by the combining module. If there is a bordering triangle that has not previously been added to another polygon, the combining module then determines if adding the bordering triangle to the current polygon would result in a polygon that falls within predetermined complexity restrictions (step 716), and if so, it is added to the polygon (step 718), otherwise the bordering triangle is not added to the polygon. The combining module continues process steps 714, 716 and 718 until all bordering triangles that can be added to the polygon without violating the complexity restrictions have been, after which the combining module closes the polygon (step 720). A new polygon record is then created by adding to it a triangle that has not previously been added to a polygon, and then steps 714, 716 and 718 are again iteratively repeated for the new polygon. Process 700 continues until all triangles defined in the triangulated graphic data 154 have been added to a polygon (in some cases, the resulting polygon may only include a single triangle, and in some cases, may include several). It will be appreciated that other processes could also be used in addition to or in place of process 700 to consolidate the triangulated graphic data. The converted graphic 104 output by the combing module 152 define, using polygons, the same fill regions that were defined in triangulation graphic data, but in a more space-efficient format.

The complexity restrictions that are applied in step 720 are generally selected based on the capabilities of the media engine at the viewing device 112, which in turn will typically depend on the processing and memory resources available at the viewing device and the bandwidth of the communications channel 114. The complexity restrictions or thresholds can vary depending on the requirements of the specific application, and in various embodiments are set up to limit the polygons defined in converted graphic 104 to polygons that are simple polygons, to polygons having no internal islands, to polygons having only convex vertices, and/or to polygons having fewer than a predetermined number of edges.

Figure 11:
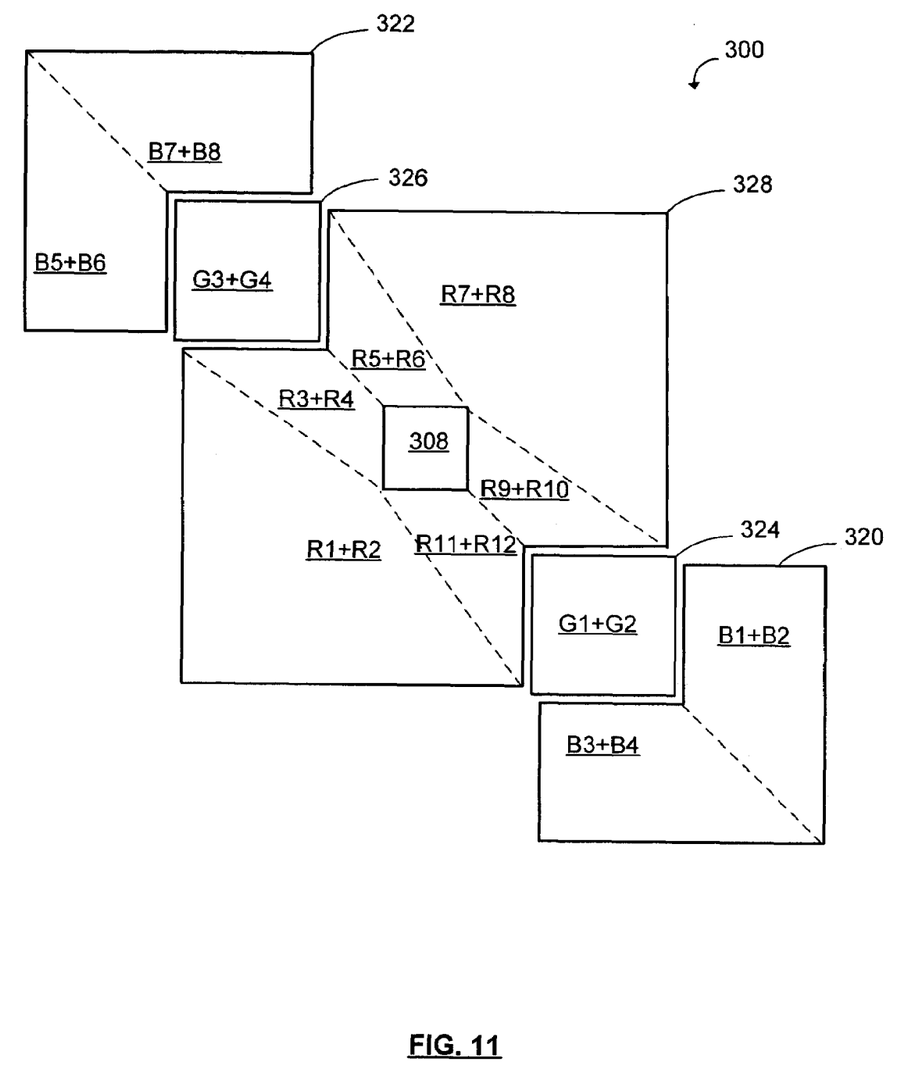
FIG. 11 is a further exploded view of the graphic object of FIG. 3.

By way of example, FIG. 11 shows a further exploded view of graphic object 300 in which the previously triangulated fill style regions may be combined by combining module 118 to form polygons. In red fill style region 328, triangles have been combined to form polygons R1+R2, R3+R4, and so on. In green fill style regions 326 and 328, the triangles have been combined to form polygons G1+G2 and G3+G4, respectively. Similarly, the triangles associated with blue fill style regions 320 and 322 have been combined to form polygons as illustrated. In the example of FIG. 11, the complexity restrictions have been applied such that all of the resulting polygons are each simple polygons that each define continuous internal same fill-style areas without internal islands and which have no reflex vertices, but rather only convex vertices. The resulting polygons of FIG. 11 are also each limited to four sides.

It will be appreciated that in computer graphics, curved lines are often formed by connecting a series of small edges at angles to each other. Thus, the methods of the present invention can also be applied to objects having what are perceived as curved boundaries.

In some embodiments, the second format converter may not go through the process of combining the triangulated graphic data 154, but rather may use such data directly for converted graphic 104.

The above-described embodiments of the present invention are intended to be examples only. Alterations, modifications and variations may be effected to the particular embodiments by those skilled in the art without departing from the scope of the invention, which is defined by the claims appended hereto.

What is claimed is:

1. A method for automated graphics conversion of graphic object data for efficient delivery from a graphic converter to wireless devices connected to a wireless communications network, the graphic object data defining a vector graphics object, the method comprising:

converting the graphic object data defining the vector graphics object from an edge record based format to a path format,
the edge record based format including a plurality of edge records each defining an edge of the graphic object, the edge records including information associating the defined edges with fill styles that the edges border against,
the path format including path elements that are each associated with a fill style and define one or more polygon shapes at least partially filled with the associated fill style, the path elements collectively defining the graphic object;

converting the graphic object data from the path format to a second format, the conversion including:
redefining the polygon shapes defined by the path elements as groups of triangles; and
combining at least some triangles in the groups of triangles into further polygon shapes that fall within complexity thresholds based on predetermined capabilities of a wireless device; and transmitting the converted vector graphics object in the second format to the wireless device over the wireless communications network for display thereon.

2. The method of claim 1 wherein the converting the graphic object data defining the vector graphics object from an edge record based format to a path format includes:
for each fill style, identifying from the edge records each unique vertex that borders on the fill style and identifying each of the outgoing edges from the identified vertices that border on the fill style; and
for each fill style, creating the associated path element, based on the identified vertices and outgoing edges.

3. The method of claim 2 wherein the path format is an SVG compatible format.

4. The method of claim 2 wherein the edge record based format is an edge record based flash file format.

5. The method of claim 1 wherein the second format graphic object data includes information defining the further polygons.

6. The method of claim 1 wherein the complexity thresholds are selected so that the further polygons each have a continuous interior fill style region without internal island contours.

7. The method of claim 1 wherein the complexity thresholds are selected so that the further polygons each have only convex vertices.

8. The method of claim 1 wherein the complexity thresholds are selected so that the further polygons each have under a predetermined number of sides.

9. The method of claim 1 wherein the complexity thresholds are selected so that the further polygons are each simple polygons.

10. The method of claim 1, wherein the edge record based format is SWF and the path format is Scalable Vector Graphics (SVG) format.

11. A method for automated graphics conversion of graphic object data for efficient delivery from a graphic converter to wireless devices connected to a wireless communications network, the graphic object data defining a vector graphics object, the conversion being from an edge record based format to a path format and then to a path based triangulated format, the edge record based format including a plurality of edge records each defining an edge of the vector graphics object, the edge records including information associating the defined edges with fill styles that the edges border against, the path format including path elements that each define one or more polygon shapes that are filled with an associated fill style, the path elements collectively defining the vector graphics object, the method comprising:

for each fill style, identifying from the edge records each unique vertex that borders on the fill style and identifying each of the outgoing edges from the identified vertices that border on the fill style;

for each fill style, creating an associated path element defining one or more polygon shapes that are filled with the identified unique fill style, based on the identified vertices and outgoing edges;

converting the graphic object data from the path format to the triangulated format by redefining the polygon shapes defined by the path elements as groups of triangles;

converting the graphic object data from the triangulated format to a further format by combining at least some of triangles in the groups of triangles into further polygon shapes that fall within complexity thresholds based on predetermined capabilities of a wireless device; and transmitting the converted vector graphics object in the further format to the wireless device over the wireless communications network for display thereon.

12. The method of claim 11, wherein the edge record based is SWF and the path format is Scalable Vector Graphics (SVG) format.

13. A system for automated graphics conversion of initial graphic object data for efficient delivery from a graphic converter to wireless devices connected to a wireless communications network, the initial graphic object data defining a vector graphics object, the conversion being from an edge record based format to a path format, the edge record based format including a plurality of edge records each defining an edge of the vector graphics object, the edge records including information associating the defined edges with fill styles that the edges border against, the system for further converting the graphic object data defining the vector graphics object having associated fill styles from the path format to a second format, the path format including path elements that are each associated with a fill style and define one or more polygon shapes at least partially filled with the associated fill style, the path elements collectively defining the vector graphics object, the system comprising:

a first sub-converter for identifying each unique fill style in the edge record based format initial graphic object data, and for each identified unique fill style, identifying from the edge records each unique vertex that borders on the fill style and identifying each of the outgoing edges from the identified vertices that border on the fill style;

a second sub-converter for creating the associated path element, based on the identified vertices and outgoing edges, for each identified unique fill style;

a triangulation module for redefining the polygon shapes defined by the path elements as groups of triangles;

a combining module for combining at least some of triangles in the groups of triangles into further polygon shapes that fall within complexity thresholds based on predetermined capabilities of a wireless device; and a transmitter for transmitting the converted vector graphics object to the wireless device over the wireless communications network for display thereon.

14. The system of claim 13 wherein the complexity thresholds are configured so that the further polygons each are selected from the group consisting of polygons that have a continuous interior fill style region without internal island contours, polygons that have only convex vertices, polygons that have under a predetermined number of sides, and polygons that are simple polygons.

15. The system of claim 13, wherein the edge record based format is SWF and the path format is Scalable Vector Graphics (SVG) format.

16. A computer software product having a computer-readable medium tangibly embodying computer executable instructions for automated graphics conversion of graphic object data for efficient delivery from a graphic converter to wireless devices connected to a wireless communications network, the graphic object data defining a vector graphics object, the computer executable instructions comprising:

computer executable instructions for converting initially the graphic object data defining the vector graphics object from an edge record based format to a path format, the edge record based format including a plurality of edge records each defining an edge of the vector graphics object, the edge records including information associating the defined edges with fill styles that the edges border against, the path format including path elements that are each associated with a fill style and define one or more polygon shapes at least partially filled with the associated fill style, the path elements collectively defining the vector graphics object;

computer executable instructions for converting the graphic object data from the path format to a second format, the conversion including:

(i) redefining the polygon shapes defined by the path elements as groups of triangles; and (ii) combining at least some of triangles in the groups of triangles into further polygon shapes that fall within complexity thresholds based on predetermined capabilities of a wireless device; and computer executable instructions for transmitting the converted vector graphics object in the second format to the wireless device over the wireless communications network for display thereon.

17. The computer software product of claim 16, wherein the edge record based format is SWF and the path format is Scalable Vector Graphics (SVG) format.

\* \* \* \* \*